United States Patent
Lee et al.

(10) Patent No.: US 7,599,609 B2
(45) Date of Patent: Oct. 6, 2009

(54) METHOD FOR RECORDING SERVICE DATA DEPENDING ON SERVICE TYPE IN DIGITAL TV COMPLEX MACHINE

(75) Inventors: Dong Il Lee, Seoul (KR); Min Young Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 763 days.

(21) Appl. No.: 11/234,473

(22) Filed: Sep. 23, 2005

(65) Prior Publication Data
US 2006/0078283 A1      Apr. 13, 2006

(30) Foreign Application Priority Data
Sep. 24, 2004   (KR)  ...................... 10-2004-0077427

(51) Int. Cl.
*H04N 5/00*      (2006.01)
*H04N 5/91*      (2006.01)

(52) U.S. Cl. ......................................... 386/125; 386/83

(58) Field of Classification Search ................. 386/125, 386/46, 83, 45, 104, 105, 106, 124, 40
See application file for complete search history.

(56) References Cited

U.S. PATENT DOCUMENTS 5,541,738 A *   7/1996   Mankovitz .................... 386/83
7,194,753 B1 *  3/2007   Fries et al. .................... 725/38

* cited by examiner

*Primary Examiner*—Robert Chevalier
(74) *Attorney, Agent, or Firm*—Lee, Hong, Degerman, Kang & Waimey

(57) ABSTRACT

Provided are a method for recording service data and a digital TV complex machine using the same. The method includes: determining whether to include OSD data as an additional data for guiding broadcasting contents to a user or providing a convenient manipulation of the digital TV complex machine to the user while recording service data; when the OSD data is not included, determining a service type of the digital TV service; extracting and outputting data designated by the determined service type; and recording the outputted data.

19 Claims, 4 Drawing Sheets

FIG. 5

| Syntax | No. of bits |
|---|---|
| component_descriptor() { | |
|     descriptor_tag | 8 |
|     descriptor_length | 8 |
|     reserved_future_use | 4 |
|     stream_content | 4 |
|     component_type | 8 |
|     component_tag | 8 |
|     ISO_639_language_code | 24 |
|     for(i=0; i<n; i++){ | |
|         text_char | 8 |
|     } | |
| } | | ns
METHOD FOR RECORDING SERVICE DATA DEPENDING ON SERVICE TYPE IN DIGITAL TV COMPLEX MACHINE

CROSS REFERENCE TO RELATED APPLICATIONS

Pursuant to 35 U.S.C. § 119(a), this application claims the benefit of earlier filing date and right of priority to Korean Patent Application No. 10-2004-0077427, filed on Sep. 24, 2004, the content of which is hereby incorporated by reference herein in its entirety.

BACKGROUND OF THE INVENTION

1. Field of the Invention

The present invention relates to a digital TV complex machine, and more particularly, to a method for recording service data depending on service types and a digital TV complex machine using the same, in which a DVD recording/playing module and a digital TV module are combined together, and signals (e.g., OSD) that a user does not want to record is excluded and only necessary video/audio signals are recorded into a storage medium.

2. Description of the Related Art

Compared with existing analog TVs, digital TVs provide much higher picture quality through the digital process of audio and video signals. With the introduction of various digital devices using an MPEG data processing technology, a complex machine with combined digital device and digital TV is available. In recent years, digital TV-DVD complex machines have been popularized.

High quality data of the digital TV can be stored in a storage medium through a digital video disc rewriter (DVD-RW). Hereinafter, a method for recording signals in a storage medium through a DVD-RW in a related art digital TV-DVD complex machine will be described.

FIG. 1 is a block diagram of a related art digital TV complex machine, and FIG. 2 is a flowchart illustrating a method for recording service data in the related art digital TV complex machine.

The conventional digital TV-DVD complex machine includes a digital TV module 110, a DVD recording/playing module 120, and a central control unit 130. The digital TV module 110 performs a function control and input/output signal processing of a digital TV. The DVD recording/playing module 120 performs a function control and input/output signal processing of a DVD. The central control unit 130 controls operation modes of the digital TV module 110 and the DVD recording/playing module 120 according to user's input.

A method for recording digital TV service data in a storage medium in the conventional digital TV-DVD complex machine will be described below.

First, the central control unit 130 outputs a command of recording digital TV service data in a DVD to the DVD recording/playing module 120 (S210), and thus the DVD recording/playing module 120 switches into a recording mode. In addition, the central control unit 130 outputs entire service data, including additional data such as On Screen Display (OSD), to the DVD recording/playing module 120.

The DVD recording/playing module 120, whose mode is switched into the recording mode, recognizes the incoming entire service data as an external input, converts them into MPEG data, and then records the MPEG data into the storage medium (S230).

The signals outputted to the digital TV include not only broadcasting contents or audio/video data representing the provided information itself, but also OSD data allowing the guidance or selection of the broadcasting or information contents.

The OSD function will be described in more detailed. The OSD is a control panel displayed on a computer monitor or TV screen, and allows the user to select an option (which is visibly displayed in a shape of a selection menu) or to control display components, such as brightness, contrast, horizontal/vertical position adjustment. The OSD is activated on a screen by a button of a TV set itself or a remote controller.

With the developments of the digital TV and graphic technique, the OSD becomes diverse, complicated, and interactive. Also, the OSD can display or search program information and set a specific channel to a parental control state. The parental control is a software tool that can allow a parent to limit a child's access to adult program or high cost program. Specifically, an electronic program guide (EPG) is a guidance data acting as an auxiliary role to make it easy for the user to access the broadcasting programs, such as synopsis or order of current or future (e.g., next 1 week) broadcasting programs, change of an expected broadcasting order.

Hereinafter, "OSD" or "OSD data" will be used to refer to all additional data, including graphic data or EPG, which can be used auxiliarily and recorded in the storage medium in the recording mode, except for the audio/video data containing the broadcasting contents or information contents themselves.

Accordingly, the signals outputted from the digital TV module 110 to the DVD recording/playing module 120 include OSD data as well as video/audio signals that the user wants to record.

In the case of a teletext of Digital Video Broadcasting-Terrestrial (DVB-T), data service is enabled by a specific key and is displayed on a screen in an OSD form or together with audio/video. In the case of European terrestrial wave, dedicated radio and audio services as well as audio/video broadcasting and data broadcasting are also provided.

The dedicated audio service includes not only audio service data but also additional data (i.e., OSD data) for processing a desktop into digital teletext. When the corresponding service data are stored in an existing method, the added OSD data are also recorded in the storage medium without filtering.

According to the methods described with reference to FIGS. 1 and 2, in order to record various types of services in the storage medium, the OSD data that the user does not want are also stored, causing an inefficient result such as a waste of resources of the storage medium. In addition, it is greatly inconvenient for the user to have to execute an additional data processing so as to obtain a desired type of data.

SUMMARY OF THE INVENTION

Accordingly, the present invention is directed to a digital TV complex machine that substantially obviates one or more problems due to limitations and disadvantages of the related art.

An object of the present invention is to provide a method for recording service data depending on service types of a digital TV, and a digital TV complex machine using the same, in which a corresponding service type of a digital TV service data with a variety of data formats is determined and only service data that a user wants is recorded into a storage medium.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for recording service data depending on service types of a digital TV complex machine, the digital TV complex machine including a digital TV module and a DVD recording/playing module, comprising: determining whether or not OSD data is included in the service data during recording the service data, wherein the OSD data is an additional data for guiding broadcasting contents to a user or providing a convenient manipulation of the digital TV complex machine to the user; determining a service type of the digital TV service, when the OSD data is not included; extracting and outputting data designated based on the determined service type; and recording the outputted data.

When the OSD data is included, all of the digital TV service data may be outputted.

When the determined service type is a teletext type and audio/video data are included in the digital TV service data, the operation of extracting the data designated by the service type may include determining whether to convert the video data into a video data of a full screen data.

When the video data is converted into the full screen size, the audio/video data may be extracted and outputted.

When the audio/video data is not included in the digital TV service data, the data output may be stopped.

The outputted data may be recorded in a DVD rewriter.

The outputted data may be recorded in a portable storage medium.

The determined service type may be one of audio, audio/video, and a teletext.

The service standard may be Digital Video Broadcasting-Terrestrial (DVB-T).

The service standard may be an Advanced Television Systems Committee (ATSC).

In accordance with another aspect of the present invention, there is provided a digital TV complex machine including: a digital TV module for outputting OSD data which is additional data, as well as broadcasting signals including audio/video signals, so as to guide broadcasting contents to a user or provide convenient manipulation of the digital TV complex machine to the user; a DVD recording/playing module for recording/playing the broadcasting signals and the OSD data outputted from the digital TV module; a data output control module for selectively extracting the output signals of the digital TV module; and a central control unit, connected to the digital TV module, the DVD recording/playing module and the data output control module, for controlling operations thereof.

The central control unit may determine whether or not the OSD data is included to service data during recording process of the service data, and wherein the OSD data is additional data for guiding broadcasting contents to a user or providing a convenient manipulation of the digital TV complex machine to the user; the central control unit determines a service type of the digital TV service, if the OSD data is not included in the service data; the central control unit commands the data output control module to extract and output data designated based on the determined service type; and the central control unit controls the DVD recording/playing module to record the data outputted from the data output control module.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram of a component descriptor syntax based on EN 300 468.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
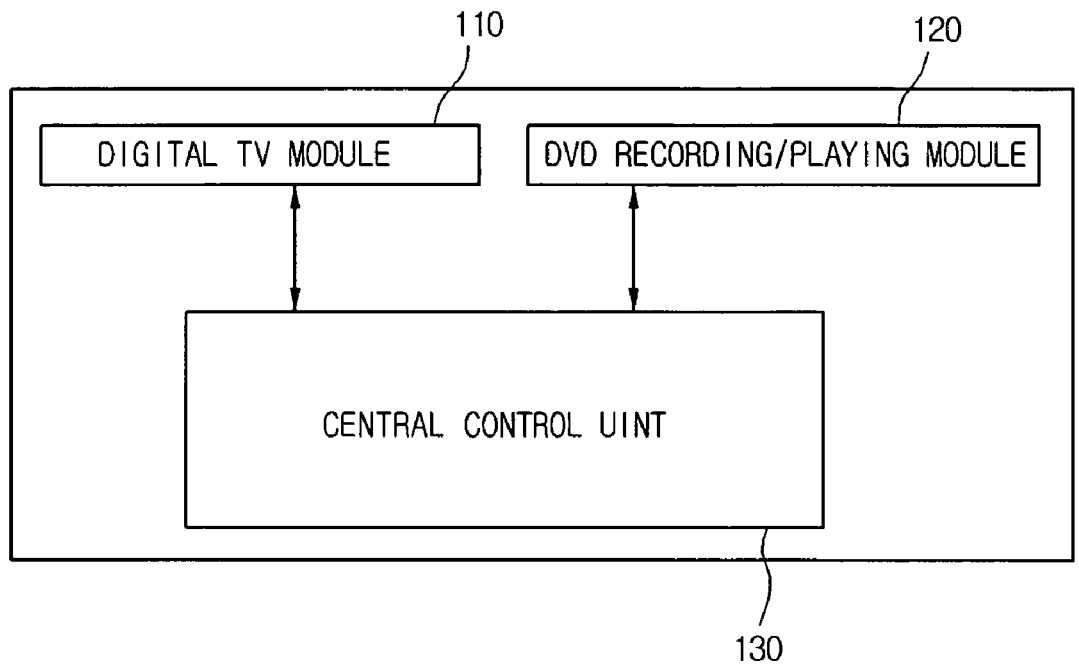
FIG. 1 is a block diagram of a related art digital TV complex machine.
Figure 2:
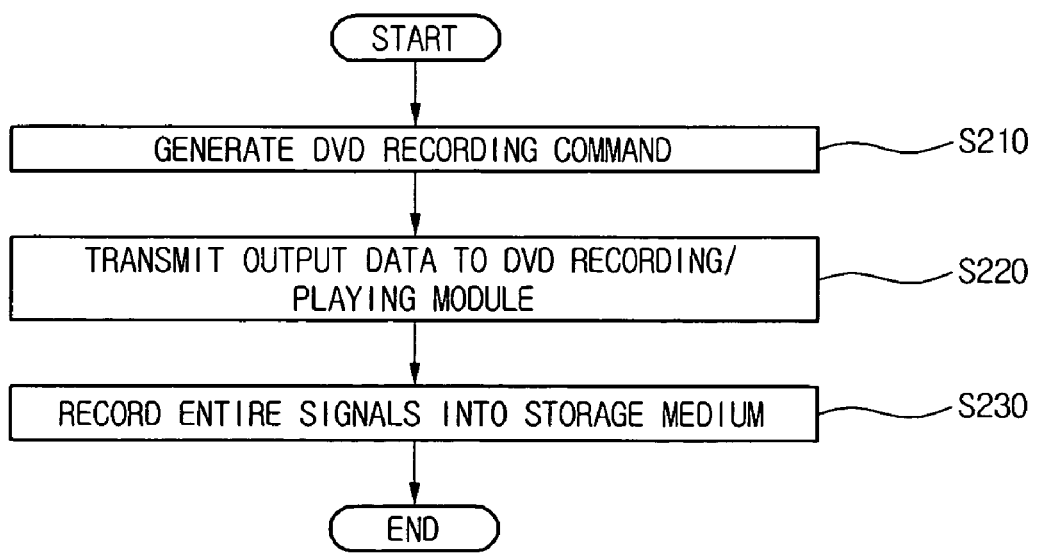
FIG. 2 is a flowchart illustrating a method for recording service data in the related art digital TV complex machine.
Figure 3:
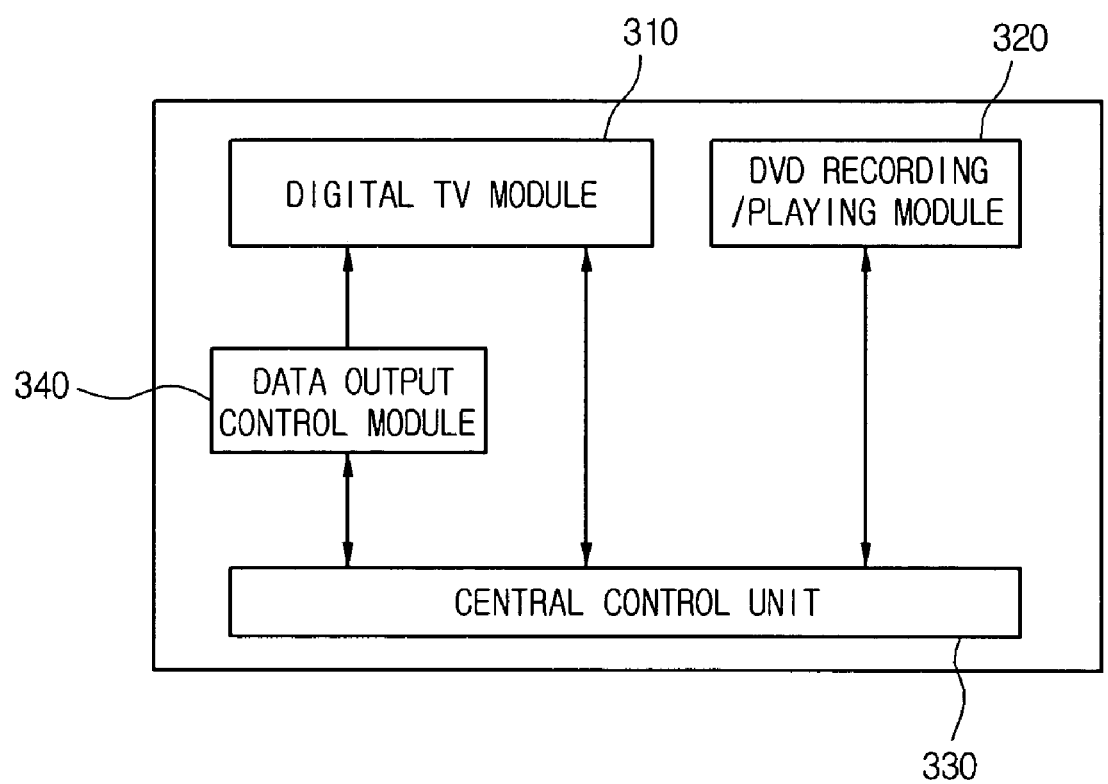
FIG. 3 is a block diagram of a digital TV complex machine according to an embodiment of the present invention.
Figure 4:
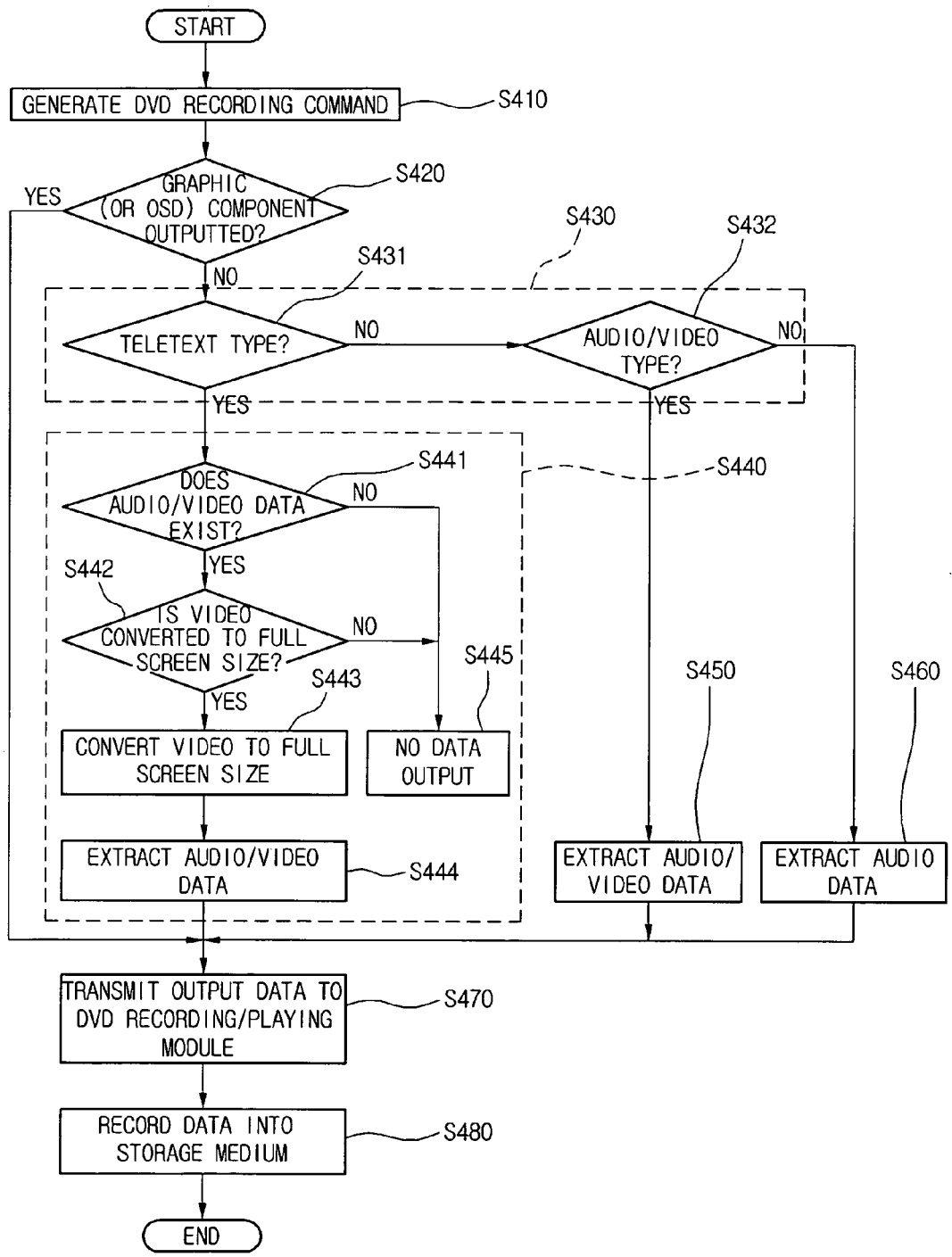
FIG. 4 is a flowchart illustrating a method for recording service data depending on service type in the digital TV complex machine according to an embodiment of the present invention.

FIG. 3 is a block diagram of a digital TV complex machine according to an embodiment of the present invention, and FIG. 4 is a flowchart illustrating a method for recording service data depending on service type in the digital TV complex machine according to an embodiment of the present invention.

The digital TV-DVD complex machine includes a digital TV module 310, a DVD recording/playing module 320, a data output control module 340, and a central control unit 330. The digital TV module 310 performs a function control and input/output signal processing of a digital TV. The DVD recording/playing module 320 performs a function control and input/output signal processing of a DVD. The data output control module 340 determines types of digital TV services and extracts data designated based on the determined service type. The central control unit 330 controls operation modes of the digital TV module 310 and the DVD recording/playing module 320 depending on the user's input.

A method for recording data depending on the service types in the digital TV-DVD complex machine will be described below.

First, the central control unit 330 outputs a DVD recording command of recording service data provided from the digital TV module 310 to the DVD recording/playing module 320 depending on the user's manipulation of the digital TV (S410). In addition, the central control unit 330 determines whether or not to record entire service data including OSD data as well as video/audio data of broadcasting contents (S420).

As described above, in the case of radio service, the OSD data represents audio data. Also, in the case of audio/video service, the OSD data represents data added in association with additional services provided other than original service data, such as audio/video data, which are selected by the user. Examples of the OSD data are graphic data, such as menus or EPG for digital teletext, basic TV function control and information service. If not special cases, it can be said that they are additional data that the user does not want to record.

If the user selects "YES" in operation S420, that is, if it is determined that the user wants to record entire service data including the OSD data, the digital TV outputs the entire service data to the DVD recording/playing module 320 according to the control of the central control unit 330 without filtering (S470). The DVD recording/playing module 320 recognizes the incoming service data as an external input, converts them into MPEG data, and then records the MPEG data into the storage medium (S480).

Meanwhile, if the user selects "NO" in operation S420, that is, if it is determined that the user wants to record only the audio/video service data except for the OSD data, the data output control module 340 determines the types of broadcasting services so as to extract necessary data (S430).

A process of determining the service types at the data output control module 340 will be described below. In this embodiment, DVB-T will be taken as an example. However, it is apparent to those skilled in the art that the present invention can also be applied to Advanced Television Systems Committee (ATSC) and Canadian Radio and Telecommunications Commission (CRTC).

FIG. 5 is a diagram of a component descriptor syntax based on EN 300 468. In the case of the DVB-T, information on each program is transmitted in a service information (SI) format. Among SI data, a component descriptor has a component_type field. FIG. 5 shows that component-type information (component_type) representing the service type is included.

This component_type can determine audio, video, data, and subtitle as the service type information (type information of ES). Accordingly, the data output control module 340 extracts and decodes the information of the component_type field and thus determines whether the corresponding service is audio, video, or data (teletext).

The determining operation in FIG. 4 will be described below in detail. First, the data output control unit 340 determines whether the corresponding service is the teletext type (S431). If the corresponding service is not the teletext type, the data output control unit 340 determines whether the corresponding service is the audio/video type (S432). Through these two procedures, the type of the corresponding service is determined.

When the service type is determined, service data designated by the service type are extracted and output. If the corresponding service is the teletext type, teletext data are extracted (S440). If the corresponding service is the audio/video type, video/audio data are extracted (S450). If the corresponding service is the radio type, audio data are extracted.

If the broadcasting signal is the teletext type, an additional process of extracting and outputting service data indicated by the teletext type is required. In the teletext type, the audio/video data may be included or may not be included. Even when the audio/video data is included, a partially compressed image data is included so that it is necessary to change it to a full screen size. Therefore, in this case, an additional data processing is required.

First, it is again determined whether the audio/video data is included in the service data (S441). If the audio/video data is not included, data is not outputted because there is no data to be extracted and recorded (S445).

If the audio/video data is included, it is determined whether to change the video data of the corresponding signal to a full screen size (S442).

If the user selects "NO", that is, if the user refuses to change the image data to the full screen size, the video data is converted into the video data of the full screen size (S443), and the converted audio/video data is extracted and outputted (S444).

The order of the process of converting into the video data of the full screen size and the process of extracting the converted audio/video data can be reversed.

Through the process of extracting and outputting the designated service data, only the service data in which the OSD component is removed is outputted and transmitted to the DVD recording/playing module 320 so as to record it in the storage medium (S470).

The DVD recording/playing module 320 recognizes the service data with no OSD component as an external input, converts them into MPEG data, and then records the MPEG data into the storage medium (S480).

Accordingly, in the case of the general program, only the corresponding video/audio data are recorded into the storage medium during the DVD recording process. In the case of the radio service, only the audio data are recorded into the storage medium during the DVD recording process. In the case of the teletext service, if the audio/video signals exist, only the audio/video data converted into the full screen size are recorded into the storage medium during the DVD recording process.

Although the digital TV-DVD complex machine has been described, the present invention is not limited to this.

In another embodiment, the present invention can be applied when the user wants to directly record only the service data of the digital TV service data into a portable information storage medium. That is, the service data extracted and outputted by the method of the present invention can be directly recorded into the portable storage medium through an interface module of the digital TV complex machine and other devices in a standardized data transmission scheme.

According to the present invention, when the user does not want to record the OSD data, only the data that the user wants except for the OSD data can be extracted and recorded. Therefore, unnecessary data recording cannot be avoided. Consequently, the resources of the storage medium can be saved and it is unnecessary to additionally process the data so as to obtain desired type of data from the recorded data.

It will be apparent to those skilled in the art that various modifications and variations can be made in the present invention. Thus, it is intended that the present invention covers the modifications and variations of this invention provided they come within the scope of the appended claims and their equivalent.

What is claimed is:

1. A method for recording service data of a digital TV complex machine depending on service types of service data, the digital TV complex machine including a digital TV module and a recording/playing module, the method comprising:

determining whether On-Screen Display(OSD) data is to be included in the service data to record, wherein the OSD data is additional data mixed with the service data for guiding broadcasting contents to a user or providing a convenient manipulation of the digital TV complex machine to the user;

determining a service type of the digital TV service, when the OSD data is not included;

extracting and outputting data designated based on the determination; and recording the outputted data.

2. The method according to claim 1, further comprising:

when the OSD data is to be included, outputting all the service data that is under service operation.

3. The method according to claim 1, wherein when the service type of the service data is a teletext type and audio/video data are included in the service data, extracting the data based on the determination comprises determining whether the video data is converted into full screen size video data.

4. The method according to claim 3, wherein when the video data is converted into full screen size video data, the audio/video data are extracted and output.

5. The method according to claim 3, wherein when the audio/video data is not included in the service data, the data output is stopped.

6. The method according to claim 1, wherein the outputted data is recorded in a DVD rewriter.

7. The method according to claim 1, wherein the outputted data is recorded in a portable storage medium.

8. The method according to claim 1, wherein the service type of the service data is one of audio, audio/video, and teletext.

9. The method according to claim 1, wherein the service data conforms to a Digital Video Broadcasting-Terrestrial (DVB-T) standard.

10. The method according to claim 1, wherein the service data conforms to an Advanced Television Systems Committee (ATSC) standard.

11. A digital TV complex machine comprising:
a digital TV module for outputting On-Screen Display (OSD) data that is additional data and outputting service data including audio/video signals, wherein the OSD data is mixed with the service data and is for guiding broadcasting contents to a user or providing a convenient manipulation of the digital TV complex machine to the user;
a recording/playing module for recording/playing the service data and the OSD data outputted from the digital TV module;
a data output control module for selectively extracting signals output from the digital TV module; and
a central control unit connected to and controlling operations of the digital TV module, the recording/playing module and the data output control module and configured to:
determine whether OSD data is to be included in the service data to record;
determining a service type of the digital TV service, when the OSD data is not included;
extract and output data designated based on the determination; and
record the outputted data.

12. The digital TV complex machine according to claim 11, wherein the central control unit commands the data output control module to output all the service data that is under service operation when it is determined that OSD data is to be included in the service data to record.

13. The digital TV complex machine according to claim 11, wherein the central control unit controls the data output control module to extract and output audio/video data converted into a full screen data if the service type of the service data is a teletext type and audio/video data are included in the service data.

14. The digital TV complex machine according to claim 13, wherein the output of the audio/video data is stopped if the audio/video data is not included in the service data.

15. The digital TV complex machine according to claim 11, wherein the recording/playing module is a DVD rewriter.

16. The digital TV complex machine according to claim 11, wherein the recording/playing module is a portable storage medium.

17. The digital TV complex machine according to claim 11, wherein the service type of the service data is one of audio, audio/video, and teletext.

18. The digital TV complex machine according to claim 11, wherein the service data conforms to a Digital Video Broadcasting-Terrestrial (DVB-T) standard.

19. The digital TV complex machine according to claim 11, wherein the service data conforms to an Advanced Television Systems Committee (ATSC) standard.

* * * * *